(12) United States Patent
Sato

(10) Patent No.: US 6,276,607 B1
(45) Date of Patent: Aug. 21, 2001

(54) DATA MANAGEMENT PLATE

(76) Inventor: Kazuo Sato, 1001-128, Aza Mura-higashi, Oaza lldera, Mondermachi, Alzuwakamatsu-shi, Fukushima, 965-0846 (JP)

( * ) Notice: Subject to any disclaimer, the term of this patent is extended or adjusted under 35 U.S.C. 154(b) by 0 days.

(21) Appl. No.: 09/556,791

(22) Filed: Apr. 25, 2000

(51) Int. Cl.[7] .................................................... G06K 19/00
(52) U.S. Cl. ........................................... 235/487; 235/492
(58) Field of Search ..................................... 235/487, 492

(56) References Cited

U.S. PATENT DOCUMENTS 6,147,604 * 11/2000 Wiklof ................................. 235/487

* cited by examiner

*Primary Examiner*—Harold I. Pitts
(74) *Attorney, Agent, or Firm*—Snider & Associates; Ronald R. Snider

(57) ABSTRACT

A data management plate records visible fixed information and variable information according to a digital signal on a mobile object itself, and improves retention of data by protecting data when the mobile object is left outdoor, and records moving state about the mobile object in itself. An IC chip provided with an antenna for recording variable information is inserted and integrally bonded between a plastic plate provided with visible fixed information such as characters, for example, a management number, a company name, etc., drawings, bar codes, two-dimensional codes, etc. on the surface of the plastic plate, and a pressure-sensitive adhesive sheet forming a pressure-sensitive adhesive layer at both surfaces of an independent foam plastic mat.

4 Claims, 3 Drawing Sheets

DATA MANAGEMENT PLATE

BACKGROUND OF THE INVENTION

1. Field of the Invention

The present invention relates to a data management plate for managing an outdoor mobile object storing fixed information and variable information.

2. Description of the Prior Art

For managing a container for baggages, it should be necessary to record a management number of the container, and the contents of the loads. The management can be realized by inputting information by using a computer, but the contents of the load are hand-written on the container itself. In addition, for managing a rent-a-car, the number of a car, the name of a user, a rental time, a time of return, a running mileage, etc. are entered in a recording book or input to a computer. In a rent-a-car system in which a car can be rented from one store and returned to another store, the stores communicate management information with each other.

However, in such a method, containers and cars themselves can be collectively managed, but it has been very difficult to record in the container itself and the car itself the variable information such as the contents of the containers, driving information, etc. Furthermore, when a mobile object is moved from a yard to another yard, a reader provided in each yard reads data for use in managing the moving information by a computer, but it has been difficult to record the moving information in the container itself or the car itself.

BRIEF SUMMARY OF THE INVENTION

Object of the Invention

The present invention is achieved to solve the above described problems, and aims at providing a data management plate capable of recording on the mobile object visible fixed information and variable information according to a digital signal, to improve the retention of data by protecting data when the mobile object is left outdoor, and to record the moving information about the mobile object in itself according to a magnetic signal.

Summary of the Invention

In the data management plate according to the present invention, an IC chip provided with an antenna for recording variable information is inserted and integrally bonded between a plastic plate provided with visible fixed information such as characters, drawings, bar codes, two-dimensional codes, etc. on the surface of the plastic plate, and a pressure-sensitive adhesive sheet forming a pressure-sensitive adhesive layer at both surfaces of an independent foam plastic mat.

The data management plate according to claim 2 is characterized in that a magnetic sensor is connected to the IC chip, and is inserted and integrally bonded between the plastic plate and the pressure-sensitive adhesive sheet. The data management plate according to claim 3 is characterized in that the visible fixed information is formed on the plastic plate by a laser sintering process, a ceramic sintering process, or a printing process. The data management plate according to claim 4 is characterized in that a concave portion is formed on a reverse of the plastic plate to hold the IC chip or/and the magnetic sensor.

DETAILED DESCRIPTION OF THE PREFERRED EMBODIMENTS

Figure 1:
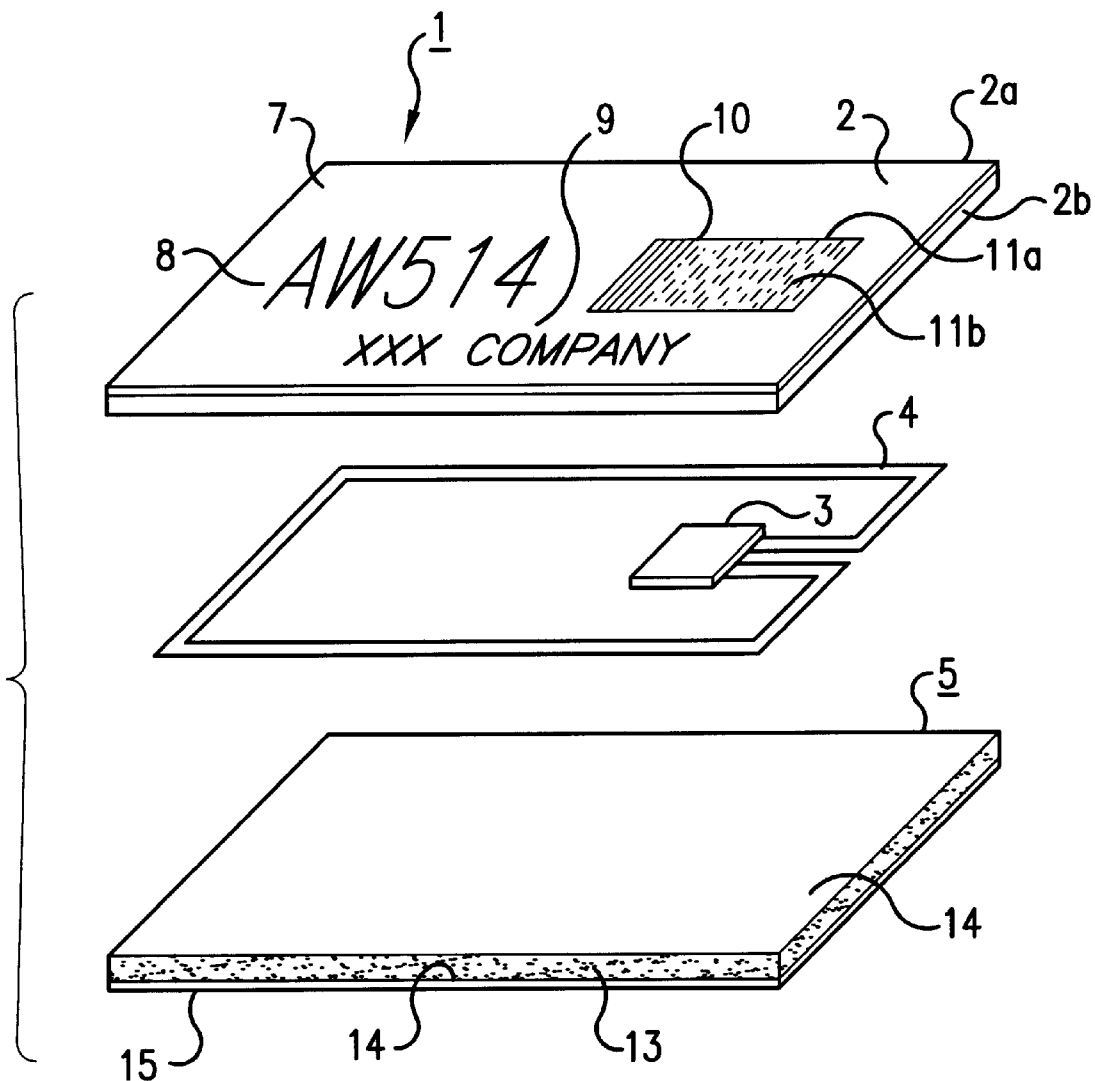
FIG. 1 is a perspective view explodedly showing a data management plate according to an embodiment of the present invention.

An embodiment of t he present invention is described below in detail by referring to FIGS. 1 through 3. FIG. 1 shows an analytic view of a data management plate 1. Reference numeral 2 denotes a plastic plate containing visible fixed information. Reference numeral 3 denotes an IC chip for storing variable information. Reference numeral 4 denotes a frame-shaped antenna connected to the IC chip 3. Reference numeral 5 denotes a pressure-sensitive adhesive sheet.

The plastic plate 2 containing visible fixed information has a two-layer structure of a white plastic plate 2a on its surface, and a black plastic plate 2b on its reverse. The plastic plate 2 is made of a material having excellent weather-proof, shock-proof, and heat-proof material properties, such as AAS resin or the like.

A display board 7 is formed on the surface of the white plastic plate 2a. On the display board 7, the surface of the white plastic plate 2a is sintered by a laser sintering device as shown in FIG. 3 to integrally form a management number 8, a company name 9, and a two-dimensional code 10 as shown in FIG. 2. The two-dimensional code 10 displays the address and the telephone number of a company in addition to the company name and the management number. For a container, fixed information such as the container capacity, the dimensions, the weight of a load, the date of manufacture, the name of a manufacturer, etc. is represented by a black and white matrix pattern formed by a white dot portion 11a and a black dot portion 11b.

The IC chip 3 can store a large volume of data, and is designed to store as digital information the variable information such as the contents of a container, the amount of its load, the transmitter of the load, the address, the name, and the telephone number of a destination company, and the fixed information stored by the two-dimensional code 10. The IC tip 3 is a flat plate that is approximately one centimeter square, and the frame-shaped antenna 4 that is formed by blanking out copper foil is connected to the IC tip 3 so as to surround the IC tip 3.

The pressure-sensitive adhesive sheet 5 is formed by a independent foam plastic mat 13 having a pressure-sensitive adhesive layer 14 on each of the surface and the reverse. The pressure-sensitive adhesive layer 14 is provided with a removable paper 15. The independent foam plastic mat 13 can be made of. for example, acrylic foam of a desired thickness of 0.5 through 5 mm. The pressure-sensitive adhesive layer 14 can be, for example, a synthetic rubber adhesive with high adhesion to metal, plastic, wood, etc. and high weather-proof and insulation properties.

Described below is an example of applying the data management plate 1 with the above mentioned configuration to a container. The data management plate 1 displays on the display board 7 the management number 8 and the company name 9 by a laser process, and generates the two-dimensional code 10. The two-dimensional code 10 represents digital data in two dimensions by a gray-scale dot matrix pattern inside the rectangular frame. As compared with a stripe bar code, it contains a larger volume of data per unit area, and can display more information.

After removing dust and stain attached to the surface of a container, the removable paper 15 on the reverse of the data management plate 1 is removed to expose the pressure-sensitive adhesive layer 14, and the layer is pushed onto the surface of the container. At this time, the Pressure-sensitive adhesive sheet 5 can totally adhere to the container with the independent foam plastic mat 13 smoothly fixed to the attachment surface of the container although there are some concave or curved portions on the attachment surface of the container. The pressure-sensitive adhesive layer 14 has the property of improving the adhesion with time after the layer has adhered to the container, thereby maintaining high adhesion for a long period.

In addition, the variable information such as the contents of the container, the amount of the load, the name of the transmitter of the load, the address, the name, and the telephone number of the destination company, etc. is preliminarily input to a handy reader capable of reading and writing data. When the handy reader approaches the data management plate 1 attached to the side of the container containing a load, the antenna 4 provided in the data management plate 1 by the magnetic field generated by the handy reader is electromagnetically induced to generate an electric current, and receives an electric wave transmitted from the handy reader, Then, the variable information is recorded as a digital signal in the IC chip 3.

Thus, a container provided with the data management plate 1 containing variable information is transmitted to a destination such as a truck, and the handy reader approaches the data management plate 1. As a result, the antenna 4 is electromagnetically induced by the magnetic field generated by the handy reader to generate an electric current, the variable information recorded as a digital signal in the IC chip 3 is transmitted from the antenna 4, and the handy reader receives the variable information, thereby reading the variable information about a container without contact.

Figure 2:
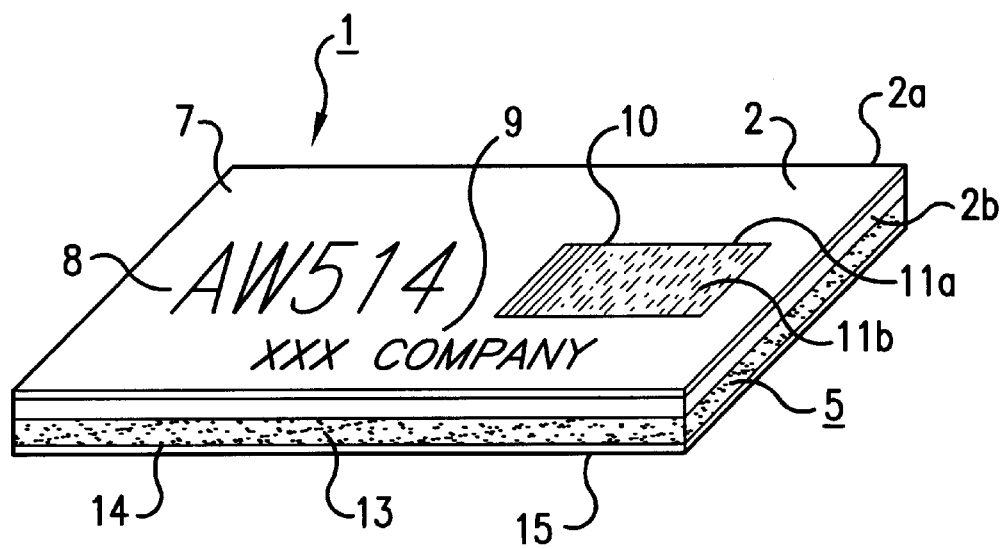
FIG. 2 is a perspective view showing the data management plate.
Figure 3:
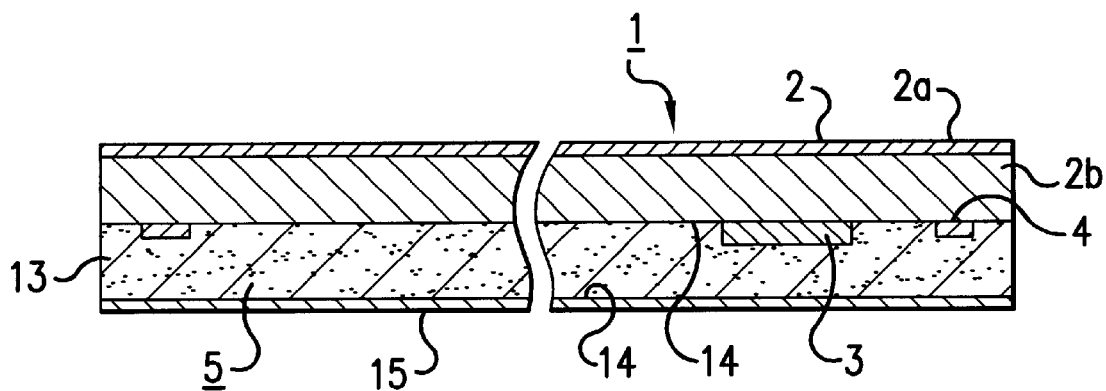
FIG. 3 is a sectional view showing the data management plate shown in FIG. 2.

Since the surface of the white plastic plate 2a is sintered by a laser sintering device into dark color, the management number 8, the company name 9, and the two-dimensional code 10 are collectively formed as shown in FIG. 2. Therefore, there occurs no peeling or wear, thereby clearly identifying the information for a long period.

If the variable information and the fixed information stored in the IC chip 3 should be damaged, the two-dimensional code 10 is read by a scanner successfully to read only the fixed information, thereby possibly using the information as backup data. Furthermore, since the two-dimensional code 10 is cubically formed on the surface of the white plastic plate 2a by the laser sintering process, it is excellent in durability. In addition, the two-dimensional code 10 can be read by a scanner from any direction, and the data can successfully recover even if a part of the two-dimensional code 10 is damaged or obscure. Furthermore, the information can be confidentially managed by encrypting the data.

Additionally, since the surface of the IC chip 3 is covered with the water-proof and weather-proof plastic plate 2, and the reverse is formed by independent foam plastic and covered with the independent foam plastic mat 13, the heat from outside and the attachment surface can be shut off, the influence of the heat can be prevented from reaching the IC chip 3, and the rainwater can be shut off to guarantee the property against humidity. Furthermore, although a foreign object clashes upon the data management plate 1, the IC chip 3 can be protected against the shock from the foreign object because the data management plate 1 is covered with the hard plastic plate 2, and the reverse of the data management plate 1 is protected against an external shock by the elastic independent foam plastic mat 13.

The data management plate 1 is attached to an outdoor container subject to a sharp temperature change, and a steel container and the black plastic plate 2b are different in heat expansion. However, the independent foam plastic mat 13 of the pressure-sensitive adhesive sheet 5 connecting them to each other absorbs the difference in heat expansion, thereby preventing the plastic plate 2 from being peeled off.

When the present invention is used in the rent-a-car management, a car number, a management number, a company name, a telephone number, etc. are described in visible characters, etc. on the plastic plate 2. In the two-dimensional code 10, in addition to the character information, the fixed information such as items described on an automobile inspection certificate, that is, the type of car, a registration date, the weight of a car, etc. is formed by the white dot portion 11a and the black dot portion 11b. In addition, on the IC chip 3, in addition to the fixed information, the variable information such as the name of the office by which a car was lent, the name of the office to which the car was returned, a mileage, the contents of an insurance, the name of the person who lent the car, etc. can be recorded.

Figure 4:
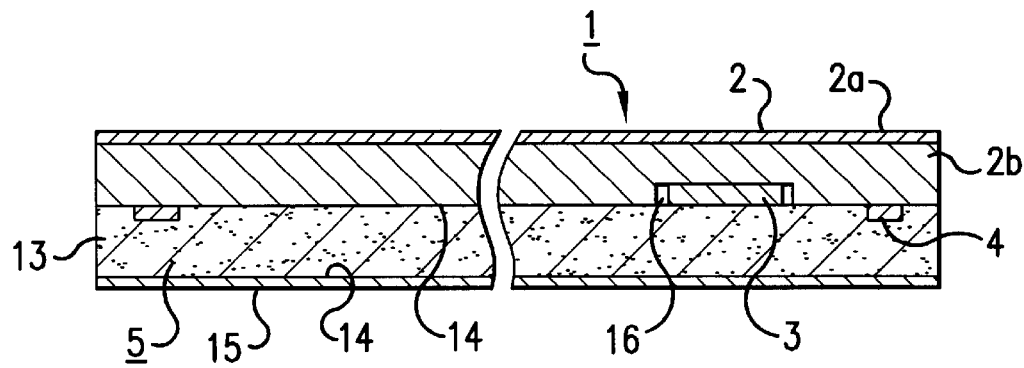
FIG. 4 is a sectional view of a data management plate having a concave portion on a reverse of a plastic plate according to another embodiment of the present invention.

FIG. 4 shows another embodiment of the present invention in which a concave portion 16 is formed on the reverse of the black plastic plate 2b forming part of the plastic plate 2 containing visible fixed information. The IC chip 3 is mounted on the concave portion 16. In this structure, the IC chip 3 is correctly supported and protected in the concave portion 16, and the pressure-sensitive adhesive sheet 5 is kept flat, thereby evenly adhering the sheet onto the attachment surface.

Figure 5:
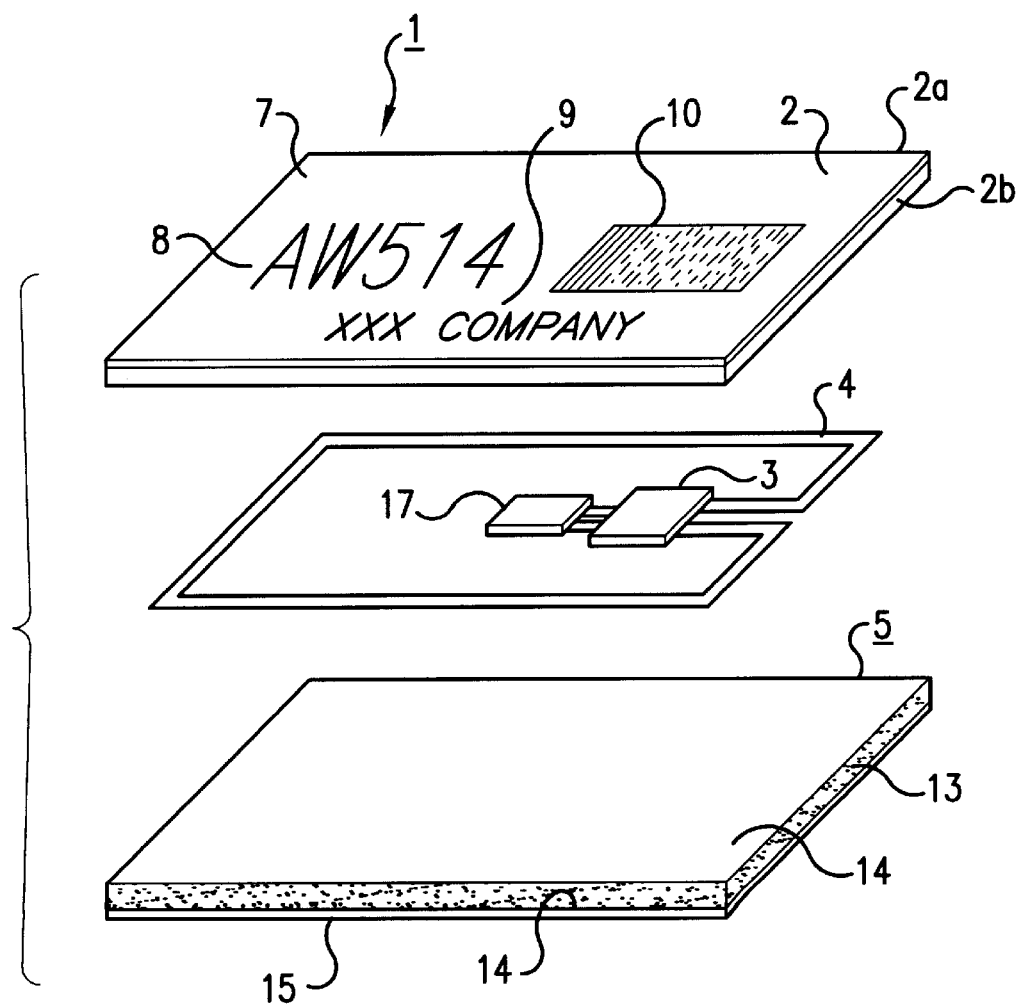
FIG. 5 is a perspective view explodedly showing the data management plate in which a magnetic sensor is connected to an IC chip according to another embodiment of the present invention.

FIG. 5 shows a further embodiment of the present invention realized by connecting a magnetic sensor 17 to the IC chip 3, and inserting and integrally bonding it between the plastic plate 2 containing visible fixed information and the pressure-sensitive adhesive sheet 5. The magnetic sensor 17 can detect very small magnetism. For example, when it is carried out of a container yard by a truck, etc., it detects the magnetism from a magnet mounted in the gate, detects the yard from which the container is transported, and records a signal by transmitting it to the IC chip 3. When the container is passed through the gate of the yard into which it is carried, the magnetic sensor 17 also detects the magnetism from the magnet mounted therein, transmits the signal of the yard to the IC chip 3, and records it.

Therefore, the contents and the transportation route of a container can be confirmed in the field by providing the magnetic sensor 17, recording a detected magnetic signal in the IC chip 3, and reading the information of the data management plate 1 mounted in the container with a handy reader.

In the description above, the visible fixed information is sintered by a laser sintering process on the surface of the white plastic plate 2a, but the information can be furthermore clearly identified for a long period by carving out character information such as the management number 8, the company name 9, etc. by a carving machine, and by exposing the black plastic plate 2b on the reverse for cubic representation.

In the description above, the plastic plate 2 is obtained by combining the white plastic plate 2a and the black plastic plate 2b, but it also can be obtained by only one layer of white plastic plate. In addition, in the description above, the character information and the two-dimensional code 10 are formed by the laser process on the display board 7 of the plastic plate 2. but they also can be formed by a ceramic sintering process, a silk screen printing process, an etching process, etc. In addition, in the description above, the character information is represented in alphanumeric characters, Kanji. etc., but the visible information can be represented by symbols, drawings, etc.

Furthermore, in the description above, the present invention is applied to the data management plate 1 attached to a container and a rent-a-car, but it can also be applied to a mobile object such as a tanker, a freight car, etc. In the described above, the present invention is applied to an outdoor mobile object. However, if the variable information such as an inspection date, an inspection item, an inspection result, an inspector, etc. is recorded in the IC chip 3 by attaching the data management plate according to the present invention to an outdoor structure such as a transforming facilities in a substation, a road, water supply and sewage works, a gas pipe, a house, etc., then an inspection history can be confirmed in the field. Furthermore, the check history can also be confirmed similarly by attaching the data management plate 1 to indoor equipment in a power station, a substation, a factory, etc.

As described above, the data management plate of the present invention is obtained by inserting and integrally bonding an IC chip having an antenna connected to the IC chip for storing variable information between a plastic plate having, on a surface, visible fixed information such as characters, drawings, bar codes, two-dimensional codes, etc. and a pressure-sensitive adhesive sheet formed by applying a pressure-sensitive adhesive layer to each side of an independent foam plastic mat. With the configuration, the visible fixed information and the variable information as digital information can be recorded on one plate.

Additionally, since the surface of the IC chip is covered with the water-proof and weather-proof plastic plate, and the reverse is covered with the independent foam plastic mat, the bad influence of heat that comes from outside on the IC chip can be prevented, and the rainwater can be shut off to guarantee the property against humidity, thereby improving the durability. Furthermore, although a foreign object clashes upon the data management plate, the IC chip can be protected against the shock from the foreign object because the surface of the data management plate is covered with the hard plastic plate. and the reverse of the data management plate is protected against an external shock by the elastic independent foam plastic mat, thereby effectively managing an outdoor mobile object especially.

In addition. the data management plate according to claim 2 is realized by connecting a magnetic sensor to an IC chip, and inserting and integrally bonding it between the plastic plate and the pressure-sensitive adhesive sheet. With the configuration, not only the contents of an outdoor mobile object but also a transportation route can be confirmed in the field by detecting the magnetism from the magnet provided in a gate when the data management plate passes by the gate, and by transmitting to the IC chip a signal of the yard by which it passes and then recording the signal.

The data management plate according to claim 3 has the visible fixed information such as characters, a bar code, a two-dimensional code, etc. collectively formed on the surface of a plastic plate by a laser sintering process and a ceramic sintering process. Therefore, it is durable against peeling and wear, and the information can be correctly read for a long period.

Furthermore, the data management plate according to claim 4 has a concave portion formed on the reverse of a plastic plate to hold the IC chip or/and the magnetic sensor. Therefore, an IC chip and a magnetic sensor can be held without fail, and a pressure-sensitive adhesive sheet can be kept flat, thereby evenly applying the data management plate to the attachment surface of a target.

What is claimed is:

1. A data management plate, wherein an IC chip provided with an antenna for recording variable information is inserted and integrally bonded between a plastic plate provided with visible fixed information such as characters, drawings, bar codes and two-dimensional codes on the surface of the plastic plate, and a pressure-sensitive adhesive sheet forming a pressure-sensitive adhesive layer at both surfaces of an independent foam plastic mat.

2. The plate according to claim 1, wherein a magnetic sensor is connected to the IC chip, and is inserted and integrally bonded between the plastic plate and the pressure-sensitive adhesive sheet.

3. The plate according to claim 1, wherein said visible fixed information is formed on the plastic plate by a laser sintering process, a ceramic sintering process, or a printing process.

4. The Plate according to claim 1, wherein a concave portion is formed on a reverse of the plastic plate to hold the IC chip or/and the magnetic sensor.

* * * * *